J. M. ERICKSON.
NEST.
APPLICATION FILED OCT. 12, 1912.
1,053,019.
Patented Feb. 11, 1913.
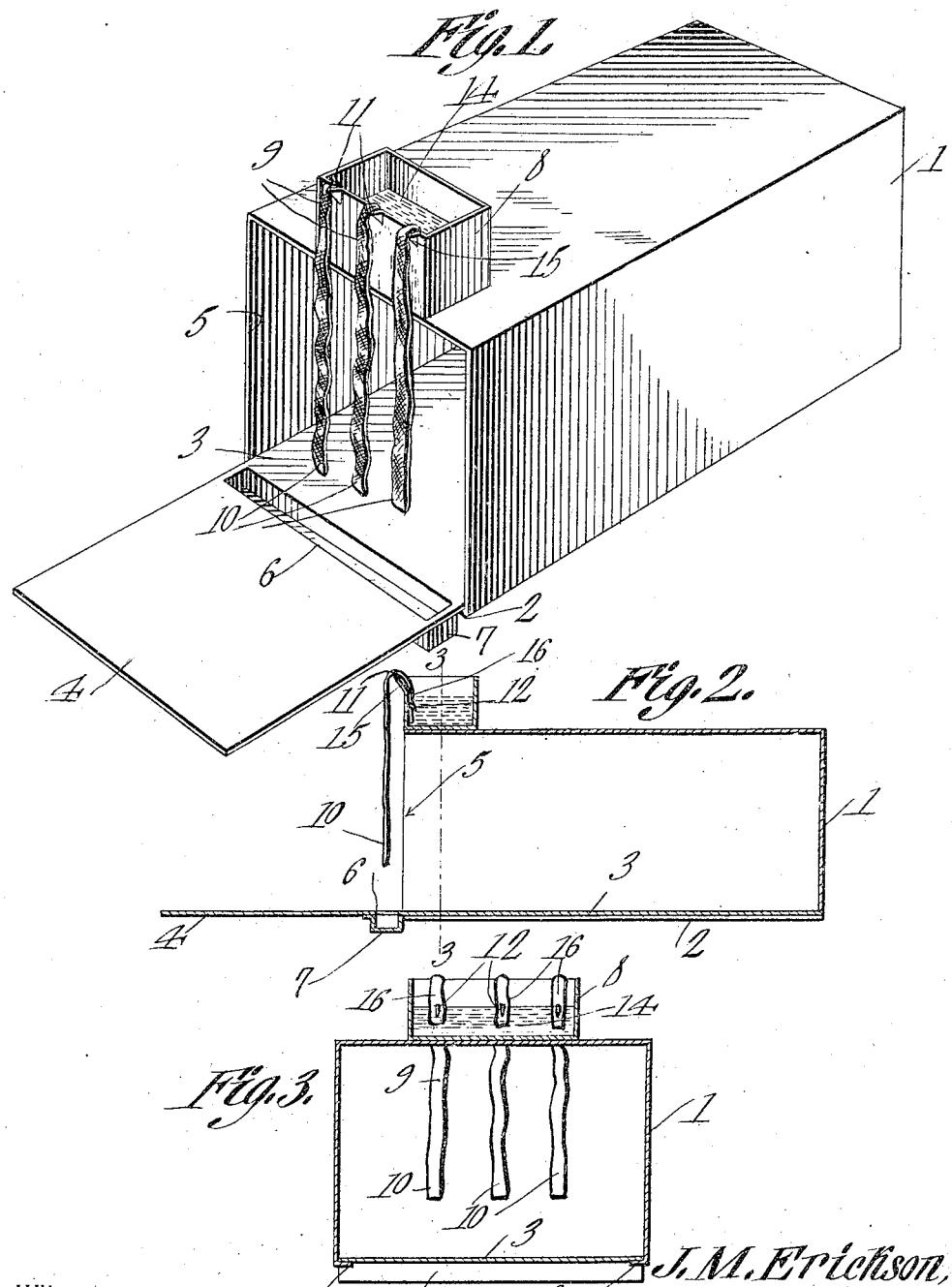
J. M. Erickson, Inventor

UNITED STATES PATENT OFFICE.

JAMES M. ERICKSON, OF MORENCI, ARIZONA.

NEST.

1,053,019.

Specification of Letters Patent.    Patented Feb. 11, 1913.

Application filed October 12, 1912.    Serial No. 725,546.

*To all whom it may concern:*

Be it known that I, JAMES M. ERICKSON, a citizen of the United States, residing at Morenci, in the county of Greenlee and State of Arizona, have invented a new and useful Nest, of which the following is a specification.

The device constituting the subject matter of this application is a nest adapted to be employed for segregating laying hens from hens which do not lay.

The invention aims to provide novel means whereby the hens are marked as they enter the nest.

One object of the invention is to provide a marking device which will not deliver an unduly large amount of marking material.

Another object of the invention is to provide novel means whereby the marking material will be prevented from soiling the nest.

The invention aims, further, to improve generally, and to enhance the utility of, devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings:—Figure 1 is a perspective; Fig. 2 is a longitudinal section; and Fig. 3 is a transverse section on the line 3—3 of Fig. 2.

In carrying out the invention there is provided a receptacle 1 which may be of any desired form. As shown, but not necessarily, the receptacle 1 is provided along its lower edge with longitudinal guides 2, receiving removably and slidably, a bottom 3, one end of which protrudes beyond one end of the receptacle 1, to form a tread member 4, the tread member 4 projecting beyond a door way 5 which is formed in one end of the receptacle 1. In the tread member 4 there is a transverse opening 6 which, in practice, is located relatively near to that end of the receptacle 1 which is provided with the door way 5. The invention may include a drip pan 7, the drip pan, in some instances, being secured to the bottom 3. The drip pan 7, in any event, is located below the opening 6 in the tread member 4.

There is provided a tank 8, in the present instance, shown as being supported upon and secured to the roof of the receptacle 1. In the upper edge of the tank 8 there may be formed a plurality of downwardly and inwardly inclined chutes 15, the outer ends of which project slightly beyond the outer face of the tank 8, for a purpose which will be set forth hereinafter. A plurality of absorbent members 9 are provided, these members 9 being constructed of wicking, or from any other material which will absorb the contents of the tank 8. The lower ends 10 of the absorbent members 9 are located in close vicinity to the door way 5 and are disposed directly above the opening 6 in the tread member 4. The upper ends of the absorbent members 9 are bent across the upper edge of the tank 8, as shown at 11, and extended into the tank, as shown at 16.

Any suitable means may be provided for maintaining the ends 16 of the absorbent members 9 in the tank 8. In the present instance, hooks 12 are formed upon the inner face of the tank 8, the hooks 12 engaging the ends 16 of the absorbent members for the purpose hereinbefore set forth. The marking liquid, indicated at 14, may be placed in the tank 8, and this marking may be of any desired form which will permit the liquid to be readily absorbed by the members 9.

In practical operation, presupposing that the parts are positioned as shown in Fig. 1, the hen first steps upon the tread member 4 and passes thence into the door way 5, the hen entering the receptacle 1 for the purpose of laying an egg therein. When the hen enters the receptacle 1, the ends 10 of the absorbent members 9 will leave a trailing mark, or a series of marks, upon the hen, thereby indicating which hen has entered the nest for the purpose of laying. The hen, of course, will be marked not only when she enters the nest, but when she leaves the same.

Owing to the fact that the absorbent members 9 are bent sharply across the upper edge of the tank 8, as indicated at 11, a surplus of marking material will be prevented from accumulating upon the depending ends 10 of the absorbent members. Further, should the ends 10, become unduly saturated, the surplus material will drop through the opening 6 in the tread member 4 into the drip pan 7, and thus a fouling of the nest will be avoided. It is to be observed, further, that the chutes 15 project slightly beyond the periphery of the tank 8, so as to prevent the absorbent members 9 from depositing material upon the outer face of the tank 8, it being obvious that such depositing of material upon the outer face of the tank should be avoided. The tank 8, of course, may be of any desired outline.

When a removable bottom 3 is employed, and when the drip pan 7 is secured to the bottom 3 it will be seen, referring particularly to Fig. 2, that the drip pan engages the ends of the guides 2, thus to position the opening 6 directly below the depending ends 10 of the absorbent members 9.

Having thus described the invention, what is claimed is:—

A nest comprising a receptacle having a door way; a bottom slidably mounted in the receptacle and provided with an extension constituting a tread member, there being an opening in the tread member; a tank supported above the door way; an absorbent strip, one end of which extends into the tank, the other end of which is disposed adjacent the door way and is alined with the opening; and a drip pan secured to the bottom below the opening, the drip pan being engaged by the receptacle to aline the opening with the strip.

In testimony that I claim the foregoing as my own, I have hereto affixed my signature in the presence of two witnesses.

JAMES M. ERICKSON.

Witnesses:
C. B. NONNAMAKER,
T. L. HOUSTON.